United States Patent
Hashimoto et al.

(10) Patent No.: US 12,447,119 B2
(45) Date of Patent: Oct. 21, 2025

(54) ORAL CARE COMPOSITION

(71) Applicant: SUNSTAR AMERICAS, INC., Schaumburg, IL (US)

(72) Inventors: Kana Hashimoto, Mount Prospect, IL (US); Toru Saito, Buffalo Grove, IL (US)

(73) Assignee: SUNSTAR AMERICAS, INC., Schaumburg, IL (US)

( * ) Notice: Subject to any disclaimer, the term of this patent is extended or adjusted under 35 U.S.C. 154(b) by 0 days.

(21) Appl. No.: 16/820,166

(22) Filed: Mar. 16, 2020

(65) Prior Publication Data

US 2020/0297602 A1 Sep. 24, 2020

Related U.S. Application Data

(60) Provisional application No. 62/820,154, filed on Mar. 18, 2019.

(51) Int. Cl.
*A61K 8/37* (2006.01)
*A61Q 11/00* (2006.01)

(52) U.S. Cl.
CPC .............. *A61K 8/375* (2013.01); *A61Q 11/00* (2013.01)

(58) Field of Classification Search
CPC ................ A61K 8/375; A61K 2800/30; A61K 2800/5422; A61K 2800/75; A61Q 11/00
See application file for complete search history.

(56) References Cited

U.S. PATENT DOCUMENTS

| | | | |
|---|---|---|---|
| 4,689,221 A | 8/1987 | Kiyoshige et al. | |
| 5,296,215 A | 3/1994 | Burke et al. | |
| 5,380,530 A | 1/1995 | Hill | |
| 5,554,315 A | 9/1996 | Tonomura et al. | |
| 5,630,999 A | 5/1997 | Burke et al. | |
| 5,693,258 A | 12/1997 | Tonomura et al. | |
| 5,698,181 A | 12/1997 | Luo | |
| 5,756,543 A | 5/1998 | Katsuragi et al. | |
| 5,843,471 A | 12/1998 | Chaykin | |
| 5,885,556 A | 3/1999 | Lukacovic et al. | |
| 6,080,481 A | 6/2000 | Ochs et al. | |
| 6,090,402 A | 7/2000 | Chaykin | |
| 6,471,945 B2 | 10/2002 | Luo et al. | |
| 6,517,815 B1 * | 2/2003 | Leinen ..................... | A61K 8/24 424/57 |
| 6,521,216 B1 | 2/2003 | Glandorf et al. | |
| 6,555,094 B1 | 4/2003 | Glandorf et al. | |
| 6,616,915 B1 | 9/2003 | Griesbach et al. | |
| 6,656,454 B1 | 12/2003 | Koester et al. | |
| 6,685,916 B1 | 2/2004 | Holme et al. | |
| 6,696,043 B2 | 2/2004 | Orlowski et al. | |
| 6,696,044 B2 | 2/2004 | Luo et al. | |
| 6,713,049 B1 | 3/2004 | White, Jr. et al. | |
| 6,770,264 B2 | 8/2004 | Stier et al. | |
| 7,094,759 B2 | 8/2006 | Senpuku et al. | |
| 7,211,700 B2 | 5/2007 | Harper et al. | |
| 7,354,569 B2 | 4/2008 | Du-Thumm et al. | |
| 7,390,518 B2 | 6/2008 | Gebreselassie et al. | |
| 7,445,769 B2 * | 11/2008 | Holme ................... | A23G 3/362 424/48 |
| 7,641,892 B2 | 1/2010 | Gebreselassie et al. | |
| 7,994,214 B2 | 8/2011 | Holm | |
| 8,071,136 B2 | 12/2011 | Kuhrts | |
| 8,231,921 B2 | 7/2012 | Bezanson et al. | |
| 8,236,292 B2 | 8/2012 | Thuresson et al. | |
| 8,263,168 B2 | 9/2012 | Bellody, Jr. et al. | |
| 8,404,261 B2 | 3/2013 | Behrends et al. | |
| 8,435,547 B2 | 5/2013 | Blass et al. | |
| 8,574,568 B2 | 11/2013 | Ueda et al. | |
| 8,586,102 B2 | 11/2013 | Rocker et al. | |
| 8,623,411 B2 | 1/2014 | Holm et al. | |
| 8,722,069 B2 | 5/2014 | Amalric et al. | |
| 8,852,617 B2 | 10/2014 | Pfirrmann et al. | |
| 8,883,225 B2 | 11/2014 | Kuhrts | |
| 8,895,084 B2 | 11/2014 | Worrell et al. | |
| 9,005,585 B2 | 4/2015 | Deckner et al. | |
| 9,161,889 B2 | 10/2015 | Guery et al. | |
| 9,241,885 B2 | 1/2016 | Roberge et al. | |
| 9,243,144 B2 | 1/2016 | Canham et al. | |
| 9,301,907 B2 | 4/2016 | Joiner et al. | |
| 9,370,472 B2 | 6/2016 | Fei et al. | |
| 9,387,158 B2 | 7/2016 | Bovetto et al. | |
| 9,446,008 B2 | 9/2016 | Reinhold et al. | |
| 9,526,692 B2 | 12/2016 | Rehage | |
| 9,545,372 B2 * | 1/2017 | Miehlich .................. | A61K 8/25 |

(Continued)

FOREIGN PATENT DOCUMENTS

| | | |
|---|---|---|
| CN | 102406567 A | 4/2012 |
| CN | 103908680 A | 7/2014 |

(Continued)

OTHER PUBLICATIONS

Deckner, George, UL Solutions, "Formulating with Glyceryl Stearate (GMS)" Feb. 6, 2015 (Year: 2015).*
Lonza, Aldo™ HMS KFG, Version 1.3, SDS No. CO00001302, Revision Date: Jan. 22, 2018 (Year: 2018).*
International Search Report and Written Opinion for Application No. PCT/US2020/022984 dated Jun. 15, 2020 (11 pages).
König et al., "Analysis of Surfactants in Toothpastes by HPLC," Analytische Chemic, 1988, vol. 331, pp. 435-436.
Amazon, "Verve Ultra SLS-Free Toothpaste with Fluoride, 4.5 oz. (Pack of 4)," <https://www.amazon.com/Verve-Ultra-SLS-Free-Toothpaste-Fluoride/dp/B00DZ3BBZ2/ref=as_at/?creati ...> webpage accessed Nov. 7, 2018.
Gettings et al., "The CFTA Evaluation of Alternatives Program: An Evaluation of In Vitro Alternatives to the Draize Primary Eye Irritiation Test. (Phase III) Surfactant-based Forumlations," Food and Chemical Toxicology, 1996, vol. 34, Issue 1, pp. 79-117.

(Continued)

*Primary Examiner* — Lezah Roberts

(74) *Attorney, Agent, or Firm* — Michael Best & Friedrich LLP

(57) ABSTRACT

An oral care composition including a base composition, and a nonionic surfactant selected from the group consisting of a monoglyceride, a diglyceride, and a combination thereof in an amount of about 0.5% to about 5.0% by weight of the oral care composition.

6 Claims, 3 Drawing Sheets

(56) References Cited

U.S. PATENT DOCUMENTS

| | | | |
|---|---|---|---|
| 9,668,945 B2 | 6/2017 | Reynolds | |
| 9,675,530 B2 | 6/2017 | Focht et al. | |
| 9,718,967 B2 | 8/2017 | Malshe | |
| 9,827,170 B2 | 11/2017 | Gadkari et al. | |
| 9,877,911 B2 | 1/2018 | Groves et al. | |
| 10,010,491 B2 | 7/2018 | Li et al. | |
| 2005/0008582 A1 | 1/2005 | Du-Thumm et al. | |
| 2005/0031551 A1 | 2/2005 | Prencipe et al. | |
| 2006/0078508 A1 | 4/2006 | Gebreselassie et al. | |
| 2006/0171907 A1 | 8/2006 | Scott et al. | |
| 2007/0025928 A1 | 2/2007 | Glandorf et al. | |
| 2008/0152636 A1 | 6/2008 | Ueda et al. | |
| 2009/0017101 A1 | 1/2009 | Holme et al. | |
| 2009/0068122 A1 | 3/2009 | Pilch et al. | |
| 2009/0155190 A1 | 6/2009 | Gebreselassie et al. | |
| 2010/0330136 A1 | 12/2010 | Rocabayera Bonvila | |
| 2011/0206739 A1 | 8/2011 | Nicolosi et al. | |
| 2012/0107258 A1 | 5/2012 | Kuhn et al. | |
| 2013/0129642 A1 | 5/2013 | Joiner et al. | |
| 2013/0142767 A1 | 6/2013 | Yamaguchi et al. | |
| 2013/0202539 A1 | 8/2013 | D'Agostino et al. | |
| 2014/0287008 A1 | 9/2014 | Lei et al. | |
| 2015/0139920 A1 | 5/2015 | Hall | |
| 2015/0246332 A1 | 9/2015 | Wang et al. | |
| 2015/0265517 A1* | 9/2015 | Manasherov | A61P 31/00 424/49 |
| 2016/0143329 A1 | 5/2016 | Todd, Jr. et al. | |
| 2017/0224609 A1 | 8/2017 | Arvanitidou et al. | |
| 2018/0042832 A1 | 2/2018 | Kalem et al. | |

FOREIGN PATENT DOCUMENTS

| | | | |
|---|---|---|---|
| CN | 104755067 A | | 7/2015 |
| DE | 3927982 | * | 2/1991 |
| EP | 0750849 A1 | | 1/1997 |
| EP | 2638892 A1 | | 9/2013 |
| EP | 2996665 B1 | | 9/2016 |
| EP | 2753292 B1 | | 6/2018 |
| EP | 3068365 B1 | | 6/2018 |
| EP | 3131640 B1 | | 7/2018 |
| EP | 2872108 B1 | | 8/2018 |
| EP | 2925280 B1 | | 8/2018 |
| EP | 3033151 B1 | | 9/2018 |
| EP | 3131639 B1 | | 9/2018 |
| JP | S63077813 A | | 4/1988 |
| JP | 2004514653 A | | 5/2004 |
| JP | 2009084277 A | | 4/2009 |
| JP | 2010195706 A | | 9/2010 |
| JP | 2013245187 A | | 12/2013 |
| RU | 2362543 C1 | | 7/2009 |
| WO | 1997022331 A1 | | 6/1997 |
| WO | 2003020047 A1 | | 3/2003 |
| WO | 2012123241 A2 | | 9/2012 |
| WO | 2014009099 A2 | | 7/2015 |
| WO | 2015189041 A1 | | 12/2015 |
| WO | 2016152273 A | | 9/2016 |
| WO | 2016156157 A1 | | 10/2016 |
| WO | 2016156161 A1 | | 10/2016 |
| WO | 2016180601 A1 | | 11/2016 |
| WO | 2016180620 A1 | | 11/2016 |
| WO | 2017005431 A1 | | 1/2017 |
| WO | 2017050528 A1 | | 3/2017 |
| WO | 2017080687 A1 | | 5/2017 |
| WO | 2017182239 A1 | | 10/2017 |
| WO | 2017182240 A1 | | 10/2017 |
| WO | 2018073062 A1 | | 4/2018 |
| WO | 2018077602 A1 | | 5/2018 |
| WO | 2018077958 A1 | | 5/2018 |
| WO | 2018099669 A1 | | 6/2018 |
| WO | 2018108389 A1 | | 6/2018 |

OTHER PUBLICATIONS

European Union Reference Laboratory for Alternatives To Animal Testing, "DB-ALM Protocol No. 99: Red Blood Cell (RBC) Lysis and Protein Denaturation," 2010, pp. 1-9.

International Preliminary Report on Patentability for Application No. PCT/US2020/022984 dated Sep. 30, 2021 (6 pages).

1 Colombian Patent Office Action for application NC2021-0012209, dated Aug. 31, 2022, 14 pages with translation.

European Patent Office Extended European Search Report for application 20773759.4, dated Mar. 16, 2023 (14 pages).

Japanese Patent Office Action for Application No. 2021-555220 dated Dec. 19, 2023 (10 pages including English machine translation).

Colombian Patent Office Action for application NC2021-0012209, dated Jan. 1, 2024, (24 pages with English machine translation).

Fragrance Journal, 1997—5, p. 80-83 (10 pages with English machine translation).

* cited by examiner

ORAL CARE COMPOSITION

CROSS-REFERENCE TO RELATED APPLICATIONS

This application claims priority to co-pending U.S. Provisional Patent Application No. 62/820,154 filed on Mar. 18, 2019, which is incorporated herein by reference.

BACKGROUND

The present invention relates to an oral care composition, such as a toothpaste or gel solution. In particular, the present invention relates to a toothpaste or gel solution having minimally-irritating properties.

Seniors and cancer patients typically have weak and sensitive oral mucosa. Irritated tissues can thin and waste away, causing sores in the mouth (i.e., ulcerative oral mucositis). Toothpaste is often one of the culprits for causing tissue irritation in the mouth. Moreover, toothpaste typically includes surfactant, and many common surfactants are known to cause tissue irritation. Surfactant sodium lauryl sulfate (i.e., SLS) is an exemplary surfactant that is generally known to irritate the oral mucosa and other tissues within the mouth. Accordingly, there is a need in the industry for irritation-free or mild toothpaste. While there are some toothpastes that claim "mildness" on the market, studies show that these are not mild enough for vulnerable oral mucosa for some populations.

SUMMARY

In one embodiment, the invention provides an oral care composition including a base composition, and a nonionic surfactant selected from the group consisting of a monoglyceride, a diglyceride, and a combination thereof in an amount of about 0.5% to about 5.0% by weight of the oral care composition.

In another embodiment, the invention provides an oral care composition including a base composition being essentially free of anionic surfactants and a nonionic surfactant wherein the nonionic surfactant is a monoglyceride, a diglyceride, or a combination thereof.

In another embodiment, the invention provides a method of reducing irritation of an oral care composition including mixing a base composition and a nonionic surfactant selected from the group consisting of a monoglyceride, a diglyceride, and a combination thereof.

Other aspects of the invention will become apparent by consideration of the detailed description and accompanying figures.

Figure 1:
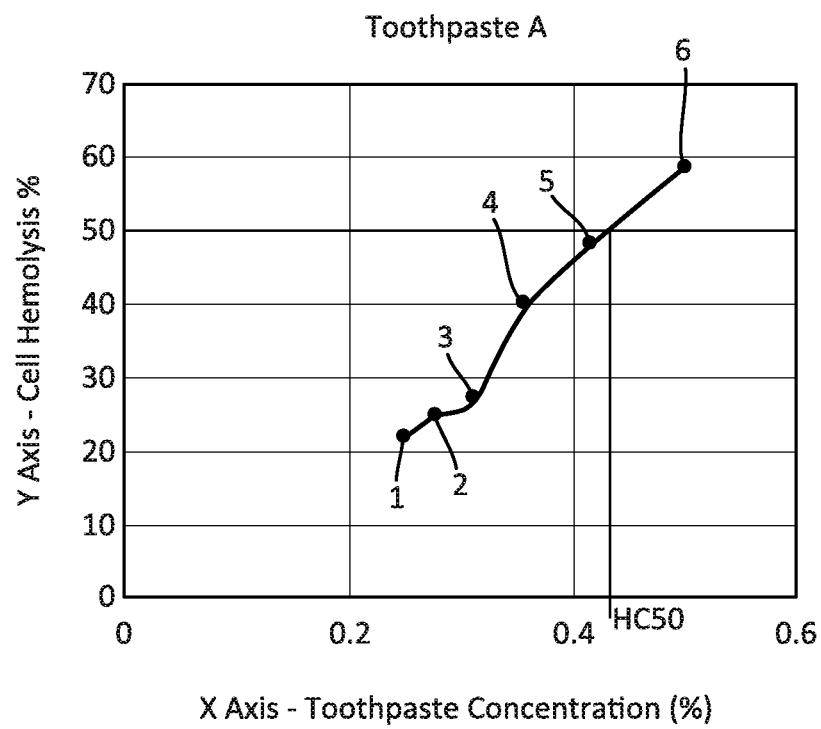
FIG. 1 shows a sample calculation for determining $HC_{50}$.

While specific embodiments are explained below, it should be understood that the invention is capable of other embodiments.

DETAILED DESCRIPTION

One embodiment of an oral care composition, such as toothpaste or a gel solution, comprises a base composition and a nonionic surfactant that includes monoglycerides, diglycerides, or a combination thereof (i.e., a monoglyceride and diglyceride mixture). In one embodiment, the oral care composition may include about 0.5% to about 8.0% by weight of a nonionic surfactant that is a monoglyceride, a diglyceride, or a combination thereof. In another embodiment, the oral care composition may include about 0.5% to about 5.0% by weight of a nonionic surfactant that is a monoglyceride, a diglyceride, or a combination thereof. In yet another embodiment, the oral care composition may include about 2.0% to about 4.0% by weight of a nonionic surfactant that is a monoglyceride, a diglyceride, or a combination thereof. In yet another embodiment, the oral care composition may include about 3.0% to about 4.0% by weight of a nonionic surfactant that is a monoglyceride, a diglyceride, or a combination thereof. In yet another embodiment, the oral care composition may include about 4.0% by weight of a nonionic surfactant that is a monoglyceride, a diglyceride, or a combination thereof. The term "about" as used herein generally means plus or minus 0.05%. Suitable monoglyceride surfactants include, but are not limited to, glyceryl monostearate, glyceryl monohydroxystearate, glyceryl monooleate, glyceryl monotallate, glyceryl monolaurate, glyceryl monobehenate, glyceryl monocaprylate, glyceryl monocapriate, glyceryl monoelaidate, esters of monoglycerides, modified monoglycerides (e.g., acetylated monoglycerides, glycerol diacetomonolaurate, glycerol monoacetomonostearate, succinylated monoglycerides), and organic acid monoglycerides (e.g., diacetyltartaric, fatty acid esters of glyceride, lactic acid ester of monoglyceride, citric acid esters of monoglyceride). Suitable diglyceride surfactants include, but are not limited to, glyceryl diacetomonolaurate, glyceryl distearate, organic acid diglycerides (e.g., lactic acid ester of diglycerides, citric acid ester of diglycerides. Other suitable nonionic surfactants for use as a monoglyceride or diglyceride include, but are not limited to, glyceryl stearate, glyceryl hydroxystearate, glyceryl oleate, glyceryl tallate, glyceryl laurate, glyceryl behenate, glyceryl caprylate, glyceryl capriate, glyceryl elaidate. Monoglyceride and diglyceride mixtures may include one or more of the monoglyceride or diglyceride surfactants listed above. Alternatively, the monoglyceride and diglyceride mixture may include mono- and di-glycerides. A definition of mono- and di-gylcerides is set forth in 2020 U.S. Pharmacopeia National Formulary, NF38, "Mono- and Di-glycerides", page 5890. Mono- and diglycerides include monoglycerides, diglycerides, triglycerides and glycerin. The raw material is made from edible oil and not completely purified to one single chemical. In other or additional embodiments, the mono- and di-glycerides may include 30% monoglycerides, 42% monoglycerides, 46% monogylcerides, 52% monoglycerides or any other suitable percentage of monogylcerides.

In one embodiment, the monoglycerides, diglycerides, or monoglyceride and diglyceride mixture is the only surfactant used in the oral care composition. That is, the oral care composition is essentially free of other surfactants. Preferably, the composition is essentially free of anionic surfactants, which are known in the industry to cause irritation of mouth tissue. In particular, the oral care composition is essentially free of sodium lauryl sulfate (SLS), which is a common anionic surfactant. The term "essentially free" generally means an amount that is less than 0.01% by weight, such as less than 0.005%, less than 0.001%, less than 0.0005%, or less than 0.0001% by weight.

The oral care composition may optionally include other surfactants. These optional surfactants, when present, may include nonionic surfactants, cationic, zwitterionic and/or amphoteric surfactants in small amounts (such as from 0.01% to 2.00% by weight).

The oral care composition may optionally include one or more of the following nonionic surfactants: sugar fatty acid esters (e.g., sucrose fatty acid esters and maltose fatty acid esters), sugar alcohol fatty acid esters (e.g., maltitol fatty acid ester), sorbitan fatty acid esters (e.g., sorbitan monolaurate, polyoxyethylene sorbitan monolaurate, polyoxyethylene sorbitan polyoxyethylene), sorbitan, fatty acid esters of monostearate, fatty acid alkanolamides (e.g., lauric acid diethanolamide, polyoxyethylene stearyl ether), polyoxyethylene alkyl ethers (e.g., polyoxyethylene oleyl ether, polyethylene glycol monooleate, polyethylene glycol monolaurate, polyethylene) glycol fatty acid esters, polyglycerol fatty acid esters, polyoxyethylene glycerin fatty acid esters, polyoxyethylene fatty acid esters, alkyl glucosides, polyoxyethylene hydrogenated castor oil, polyoxyethylene polyoxypropylene block copolymers and the like, poly polyoxyethylene hardened castor oil, polyoxyethylene polyoxypropylene block copolymers, alkyl glucosides, polyoxyethylene glycerin fatty acid esters, polyoxyethylene sorbitan fatty acid esters, polyoxyethylene alkyl ethers, fatty alkanolamides, polyethylene glycol fatty acid esters, polyglycerol fatty acid esters, polyethylene glycol ether (e.g., isoceteth-20). The oral care composition may also or alternatively include one or more of the following zwitterionic and/or amphoteric surfactants: amino acid type, betaine type, alkylamide betaine type, sulfobetaine type, an imidazoline type and the like, 2-alkyl-N-carboxymethyl-N-hydroxyethyl imidazolinium betaine or coconut such as oil fatty acid amide propyl betaine.

The base composition may optionally include other soothing or desensitizing agents to prevent or reduce irritation of the tissues of the mouth. The soothing agent can be selected from aloe extract, allantoin, alpha lipoic acid, arnica extract, azulene, basil extract, berry extract, beta glucan, bisabolol, black cumin extract, burdock extract, calendula extract, cardamom extract, chamomile extract, clover extract, cornflower extract, echinacea extract, feverfew extract, geranium extract, garlic extract, ginger extract, glucosamine, glycosyl trehalose, glycyrrhizin, goldenseal extract, gotu kola extract, grape extract, green/white tea extract, horseradish extract, lavender extract, lichochalcone extract, licorice extract, magnolia extract, mallow extract, meadowsweet extract, mugwort extract, mulberry extract, mushroom extract, neem extract, oat extract, passionflower extract, pomegranate extract, purslane extract, red clover extract, red hogweed extract, resveratrol, rose geranium extract, rose hips extract, sea buckthorn extract, sea whip extract, sneezeweed extract, soybean extract, urea, willow herb extract, yucca extract. One exemplary desensitizing agent is 4-t-butylcyclohexanol. Some embodiments include one or a plurality of soothing agents in total amounts ranging between about 0.01% and about 5%, about 0.1% and about 3%, or about 0.5% and about 2%, by weight (inclusive of any amount falling between those numbers). Similarly, some embodiments include one or a plurality of desensitizing agents in total amounts ranging between about 0.01% and about 5%, about 0.1% and about 3%, or about 0.25% and about 1.5%, by weight (inclusive of any amount falling between those numbers).

The base composition may optionally include a flavoring agent. Suitably, the base compositions described herein comprise a flavoring agent or a combination of two or more flavoring agents. A substantial variety of flavoring agents are known. The flavoring agent can be selected from any appropriate flavoring agent known in the art for use in oral care compositions. Flavoring agents can include natural, nature-identical, natural/artificial and artificial flavorants and flavoring substances (e.g., oils, oleoresin, extracts, distillate, essence, and the like) that function primarily as a flavor and provide little or no nutritional value. Examples of a suitable flavoring agent include fruit flavor such as, for example, melon, cherry, berry (e.g., raspberry, strawberry, blueberry, cranberry, etc.) banana, grape, citrus (e.g., orange, lemon, lime, grapefruit, etc.), pear, apple, pineapple, mango, passion fruit, papaya, coconut, and the like; mint such as, for example, peppermint, spearmint, wintergreen, and the like; herbal/savory/sweet (e.g., cinnamon, anise, sassafras, sarsaparilla, vanilla, chocolate, nutmeg, acacia, molasses, clove, honey, fennel, ginger, caraway, coriander, eucalyptus, rosemary, basil, oregano, thyme and the like). Combining flavors can be performed by one of skill to achieve any desired flavor profile, (e.g., a mixed berry, fruit punch, tropical fruit, bubblegum, sweet mint, herbal mint, etc.). Other flavoring agents/components can be added as desired. Such components include floral, earthy, woody, pine, herbal, tea-like, musty and cheesy aroma and taste nuances. One of skill in the art will be able to determine the amounts and combination of flavor components that can be added in order to achieve a desired flavor profile. Some embodiments provide for one or a plurality of flavoring agents in total amounts ranging between about 0.01% and about 5%, about 0.05% and about 3%, or about 0.1% and about 1%, by weight (inclusive of any amount falling between those numbers).

The base composition may optionally include a sweetening agent. Sweetening agents may be used in addition to, or in place of, one or more flavoring agents, which helps to make the oral care composition more pleasant and palatable. Accordingly, the amount of the sweetener will be dependent on the sweetness level of the particular sweetener used in the formulation. Suitable examples of sweetening agents include saccharin, saccharin sodium, acesulfame potassium, aspartame, neotame, sucralose, L-phenylalanine, stevia extract, stevioside, monk fruits extract, neohesperidyl dihydrochalcone, glycyrrhizin, perillartine, thaumatin, aspartyl phenylalanine methyl ester, methoxy cinnamic aldehyde, palatinose, palatinit, isomalt, erythritol, maltitol, xylitol, lactitol, and the like. Some embodiments provide for a sweetener in amounts ranging between about 0.001% and about 10%, about 0.01% and about 8%, or about 0.02% and about 5%, by weight (inclusive of any ranges and amounts falling between those numbers). As will be appreciated by one of skill in the art, the amount of sweetener can vary depending on the particular sweetener used in the formulation. The relative sweetness of a number of sweetening agents are known in the art (e.g., aspartame is about 200 times as sweet as sugar; saccharin about 300-500 times, sucralose about 600 times, acesulfame about 200 times, and neotame about 8000 times).

The base composition may optionally include a humectant agent, such as glycerin, sorbitol, propanediol, ethylene glycol, propylene glycol, polyethylene glycol (e.g. PEG 400, PEG 4000, etc.), and polypropylene glycol, lactitol, and the like. The amount of humectant agent is added such that the desired physical characteristic(s) of the toothpaste is achieved. Some embodiments provide for a humectant agent in amounts ranging between about 20% and about 85%, about 40% and about 80%, or about 50% and about 70%, by weight (inclusive of any amount falling between those numbers).

The base composition may optionally include one or a plurality of coloring agents that may be natural or synthetic dyes and pigments, suitable for use in the oral cavity of humans (e.g., adults and/or small children). Examples of colorants include dyes, lakes, and pigments and may include, but are not limited to, titanium dioxide, iron oxides, dyes such as, for example, FD&C Lakes, Carmine Lake, D&C Yellow 10, FD&C Blue no. 1, FD&C Blue no. 2, FD&C Red no. 3, FD&C Red no. 40, FD&C Yellow no. 5, FD&C Yellow no. 6, FD&C Green no. 3, alumina, talc, annatto extract, calcium carbonate, canthaxanthin, caramel, (3-carotene, carmine, dihydroxyacetone, turmeric oleoresin, cochineal extract, gardenia yellow, gardenia blue, beet powder, grape skin extract, riboflavin, purple sweet potato, red sweet potato, chlorophyll-containing extracts, purple blend, carmine high tint, pearlescent pigments, natural colorants, and the like. Other examples of colorants are found in 21 C.F.R. §§ 73 and 74. Suitable quantities of coloring agent will depend largely on the individual characteristics of the agent, which is generally provided in an amount such that a pleasing color is generated. Some embodiments can include amounts ranging between about 0.00001% and about 2%, about 0.00005% and about 1.0%, or about 0.00008% and about 0.8%, by weight (inclusive of any amount falling between those numbers).

The base composition may optionally include polishing or abrasive materials, such as any suitable synthetic or natural abrasive material to gently remove plaque and/or biofilm from teeth. Examples include silicas, hydrated silicas, aluminas, calcium carbonates, sodium bicarbonate (i.e., baking soda), dicalciumphosphates, calcium pyrophosphates, hydroxyapatites, trimetaphosphates, insoluble hexametaphosphates, and also including agglomerated particulate abrasive materials. Some embodiments provide for polishing or abrasive agents in amounts ranging between about 0.1% and about 35%, about 1% and about 25%, or about 5% and about 20%, by weight (inclusive of any amount falling between those numbers).

In some embodiments, the base composition can optionally include binders and/or thickening agents such as the non-limiting examples of sodium carboxymethyl-cellulose, cellulose, xanthan gum, gum arabic, karaya gum, bentonite, sodium alginate, methylcellulose, magnesium aluminum silicate, carrageenan, as well as synthetic polymers such as carbomers, polyacrylates, modified acrylic polymers, and carboxyvinyl polymers such as Carbopol®. Suitably, embodiments provide for a binder/thickener in amounts ranging between about 0.05% and about 8.0%, about 0.1% and about 4.5%, or about 0.5% and about 3.0%, by weight (inclusive of any amount falling between those numbers).

In some embodiments the base composition contains no fluoride, while in embodiments the base composition optionally comprises an effective amount of fluoride (e.g., a source of fluoride ion) to help prevent or slow tooth decay. In any of these embodiments, the oral care composition can provide for the general cleaning of the teeth as well as the overall oral cavity (e.g., gums, tongue, palate, lips, and/or teeth). In such embodiments, the amount of fluoride provided in the base composition is adequate to comply with various local requirements for fluoride-containing dentifrices, such as, for example, the requirements of the U.S. or Canadian monographs. In some embodiments the amount of fluoride in the base composition can range from about 500 ppm to about 6000 ppm, about 700 ppm to about 7000 ppm or about 850 ppm to about 6000 ppm. The fluoride in the base compositions described herein can be provided by any suitable fluoride source and, in some embodiments, comprises a fluoride compound that has been approved by a regulatory agency for safety and efficacy. Examples of suitable fluorides are stannous fluoride, sodium fluoride, amine fluorides, sodium monofluorophosphate, and the like, or any suitable combination thereof.

The base composition also optionally comprises an amount of water, suitably in an amount that is able to solubilize added salts and other water-soluble compounds.

Other optional ingredients that can be included in the base composition are, for example, antimicrobial agents such as cetylpyridinium chloride, eucalyptol, menthol, methyl salicylate, thymol and chlorhexidine, bleaching agents such as peroxy compounds (e.g., hydrogen peroxide, carbamide peroxide, organic peracids, potassium peroxydiphosphate, and the like); effervescing systems such as sodium bicarbonate/citric acid systems (i.e., citric acid monohydrate), color change systems, and the like, such as those known in the art. The base compositions may, furthermore, comprise (colored) microcapsules which contain a solid or liquid core, to impart a speckled appearance to the oral care compositions, particularly when the latter are in gel form.

Embodiments provide for oral care compositions and formulations that are storable and/or have an extended shelf life capacity. Accordingly, embodiments relate to oral care compositions that optionally include one or more preservatives such as, for example, p-hydroxybenzoic acid methyl, p-hydroxybenzoate ethyl, p-hydroxybenzoate propyl, p-hydroxybenzoate esters such as butyl p-hydroxybenzoic acid, benzoates such as sodium benzoate and benzoic acid, sorbates such as potassium sorbate and sorbic acid, like phenols such as phenoxyethanol or o-Cymen-5-ol, D-glucono-1,5 lactone and calcium gluconate. Further, such embodiments can further comprise a container and/or packaging that is effective as a barrier (e.g., barrier(s) to light, moisture, oxidation, etc.) that slows or prevents the uptake or incorporation of external elements in the oral care composition.

One of skill in the art will appreciate that many combinations of the above-identified components can be used to arrive at a suitable formulation for a mild oral care composition. Moreover, in general, the compositions as disclosed herein may be prepared by any suitable method.

One exemplary embodiment of a mild oral care composition that is a toothpaste is shown in Table 1 below:

TABLE 1

| Ingredient | Concentration (% by weight) |
| --- | --- |
| Purified water | Balance |
| Sorbitol (70%) | 40.0 |
| Glycerin | 15.0 |
| Propanediol | 10.0 |
| Sodium citrate dihydrate | 0.2 |
| Xylitol | 1.0 |
| Sodium fluoride | 0.24 |
| Citric acid monohydrate | 0.1 |
| Sucralose | 0.5 |
| Sodium benzoate | 0.1 |
| Hydrated silica | 15.0 |
| Xanthan gum | 2.0 |
| Titanium dioxide | 0.5 |
| Mono- and di-glycerides | 4.0 |
| Flavor | 0.5 |

The surfactant in the oral care composition of Table 1 is a nonionic surfactant, particularly, a monoglyceride and diglyceride mixture including multiple mono glycerides and multiple diglycerides. The nonionic surfactant in the formulation of Table 1 is specifically Aldo® HMS (Lonza Inc., Allendale N.J.), which is "mono- and di-glycerides" and has 52% of monoglyceride (alpha) by weight. In other embodiments, the surfactant may be any suitable monoglyceride, diglyceride, or monoglyceride and diglyceride mixture, as discussed above.

Cell Hemolysis Experiments

Experiments 1-4, reported below, used a cell hemolysis method to measure and quantify adverse effects of several compositions on the cytoplasmic membrane (hemolysis). The cell hemolysis method uses mammalian erythrocytes (i.e., red blood cells) to measure the membranolytic activity of a test substance. In particular, the cell hemolysis method evaluates the substance's ability to cause destruction of cells in erythrocytes as a measure of cytotoxicity. That is, the cell hemolysis method measures the ability of a solution to cause cell death. Accordingly, the cell hemolysis method was used to evaluate the irritation potential of different surfactants when used in oral care compositions. The cell hemolysis method of Experiments 1-4 was used in lieu of the Draize test for ethical reasons. The merits of this cell hemolysis method as compared to the Draize test are presented in the following literature references: Food and Chemical Toxicology 34 (1996) 79-117, Gettings et al, The CFTA evaluation of in vitro alternatives to the Draize primary eye irritation test (phase III) chemical based formulation; DB-ALM protocol no 37, Red Blood Cell (RBC) test system.

The cell hemolysis method of Experiments 1-4 reported in this application yielded an $HC_{50}$ value for each composition of toothpaste (hereafter toothpaste). The $HC_{50}$ value was calculated based on the cell hemolysis of distilled water. When red blood cells are placed in distilled water, which is hypotonic compared to the solution contained within the cells' membranes, the distilled water will diffuse into the red blood cells and cause them to burst. Accordingly, the percentage of cell hemolysis or death of red blood cells in distilled water is 100% and is therefore the control solution. The control solution yields a control reading when measured using UV-vis spectrophotometric optical density at a wavelength of 560 nm ($OD_{560}$). Half of the specified reading represents 50% cell hemolysis and was used in Experiment 1 as the $HC_{50}$ value. That is, the $HC_{50}$ value represents the toothpaste concentration that causes 50% cell hemolysis. The more concentration of toothpaste solution it takes to achieve 50% cell hemolysis, the less irritating the toothpaste solution. In contrast, the less concentration of toothpaste solution it takes to achieve 50% cell hemolysis, the more irritating the toothpaste solution.

Assay Method

Cell hemolysis for Experiments 1-4 was determined using the following assay method. First, six solutions were prepared for each toothpaste of the various experiments. Each of the six solutions included a different amount of oral care composition (e.g., toothpaste) and phosphate buffered saline (PBS). A first solution 1 was created with 0.250% of toothpaste, a second solution 2 was created with 0.277% of toothpaste, a third solution 3 was created with 0.312% toothpaste, a fourth solution 4 was created with 0.357% toothpaste, a fifth solution 5 was created with 0.416% toothpaste, and a sixth solution 6 was created using 0.5% toothpaste. Then, 975 µL of each of the six solutions was mixed with 25 µL of red blood cell suspension to create six assays. Each of the six assays was vortexed for twenty seconds, incubated for ten minutes, and centrifuged for two minutes at 5000 rpm. The resultant supernatant for each of the six assays was then transferred to 1 cm cuvettes and inserted into a spectrophotometer, which measured the UV-vis spectrophotometric optical density at a wavelength of 560 nm. This measurement resulted in an $OD_{560}$ measurement representing the percentage of cell hemolysis of each of the six assays (i.e., concentrations of toothpaste). The percentage of cell hemolysis was determined by dividing the $OD_{560}$ measurement of the toothpaste and red blood cells mixture by the control $OD_{560}$ measurement (e.g., the DI waster and red bloods cells mixture) and multiplying by 100.

FIG. 1 corresponds to Table 2 below and illustrates a sample $HC_{50}$ calculation for Toothpaste A. The control $OD_{560}$ measurement was 3.2558, which was calculated from an average of three samples. A plot was constructed using a scale of % Cell Hemolysis (Y axis) vs. % Toothpaste Concentration (X axis). The $HC_{50}$ value was determined by the corresponding toothpaste concentration at 50% cell hemolysis. As shown in FIG. 1, the concentration of Toothpaste A that achieves 50% cell hemolysis is between 0.416% and 0.5%. A calibration curve was prepared between the data at 0.4165% and 0.5%. The concentration of Toothpaste A that achieves 50% cell hemolysis (e.g., the $HC_{50}$ value) was then calculated from the calibration curve. The $HC_{50}$ value for Toothpaste A was about 0.431%.

TABLE 2

| Solution No. | Toothpaste A Concentration | $OD_{560}$ Measurement | % Cell Hemolysis |
|---|---|---|---|
| 1 | 0.250 | 0.7032 | 21.59 |
| 2 | 0.277 | 0.7992 | 24.54 |
| 3 | 0.312 | 0.8794 | 27.00 |
| 4 | 0.357 | 1.2908 | 39.64 |
| 5 | 0.416 | 1.5674 | 48.14 |
| 6 | 0.500 | 1.9104 | 58.67 |

For some samples, a preliminary test was conducted to determine the approximate range of concentrations that resulted in minimal cell hemolysis and 100% cell hemolysis. For example, the range may be 0.250% and 6.25%. Then, once that range was determined, some samples were tested using three samples having concentrations within that range. For example, three concentrations were chosen from a list consisting of 6.25%, 4.167%, 2.500%, 1.667%, 1.000%, 0.833%, 0.500%, 0.416%, 0.357%, 0.250%. Then, the results were plotted as discussed above to determine the $HC_{50}$ value for each sample.

Experiment 1

Nine oral care compositions (e.g., toothpastes) were created and measured using cell hemolysis via the assay method above. Eight of the oral care compositions included different surfactants, and one of the oral care compositions did not include surfactant. Toothpaste composition 10 included mono- and di-glycerides as the surfactant at about 1% by weight. Toothpaste 12 had no surfactant. Toothpaste composition 16 included polysorbate 20 as the surfactant at about 1% by weight. Toothpaste composition 18 included sodium lauroyl glutamate as the surfactant at about 1% by weight. Toothpaste composition 20 included sodium cocoyl glycinate as the surfactant at about 1% by weight. Toothpaste composition 22 sodium myristoyl glutamate as the surfactant at about 1% by weight. Toothpaste composition 24 included lauryl glucoside as the surfactant at about 1% by weight. Toothpaste composition 26 included cocamidopropyl betaine (CAPB) as the surfactant at about 1% by weight. Toothpaste composition 28 included sodium lauryl sulfate (SLS) as the surfactant at about 1% by weight. The surfactants in toothpaste compositions 10, 16, and 24 are nonionic surfactants, the surfactants in toothpaste compositions 18, 20, 22, and 28 are anionic surfactants, and the surfactant in toothpaste composition 26 is an amphoteric surfactant.

Figure 2:
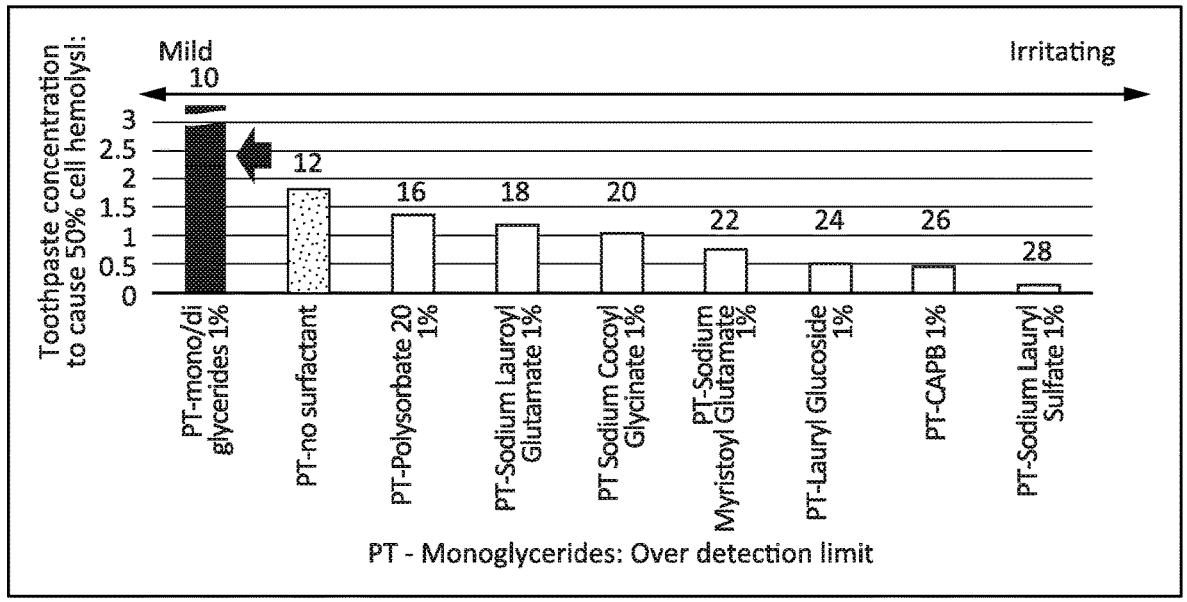
FIG. 2 shows the results of Experiment 1.

The results of Experiment 1 are shown in FIG. 2 (represented in Table 3 below), which measures the toothpaste concentration that causes 50% cell hemolysis. Toothpaste composition 10 having mono- and di-glycerides as the surfactant was the least irritating toothpaste as demonstrated by the more than 6.25% of the toothpaste composition 10 necessary to achieve 50% cell hemolysis. On the other hand, toothpaste composition 28 having the sodium lauryl sulfate (SLS) as the surfactant was the most irritating toothpaste as demonstrated by the about 0.12% of the toothpaste composition 28 to achieve 50% cell hemolysis. The other toothpaste compositions 12, 16, 18, 20, 22, 24, 26 fell along a spectrum between toothpaste compositions 10, 28. Notably, toothpaste composition 10 was even less irritating than toothpaste composition 12, which had no surfactant. This is important because even though surfactants are known to be irritating, Experiment 1 shows that using mono- and di-glycerides as a surfactant is less irritating than no surfactant. This may be because using mono- and di-glycerides as a surfactant may lower irritation of other chemicals. Oral care compositions that have monogylcerides, diglycerides, or a monoglyceride and diglyceride mixture (such as mono- and di-glycerides) may have an $HC_{50}$ concentration of greater than 1.83%

TABLE 3

| Solution No. | Surfactant Type | $HC_{50}$(% by weight) |
| --- | --- | --- |
| 10 | Mono- and di-glycerides 1.0% | Over 6.25 |
| 12 | No surfactant | 1.83 |
| 16 | Polysorbate 20 1.0% | 1.38 |
| 18 | Sodium Lauroyl Glutamate 1.0% | 1.18 |
| 20 | Sodium Cocoyl Glycinate 1.0% | 1.05 |
| 22 | Sodium Myristoyl Glutamate 1.0% | 0.77 |
| 24 | Lauryl Glucooside 1.0% | 0.48 |
| 26 | CAPB 1.0% | 0.46 |
| 28 | Sodium Lauryl Sulfate 1.0% | 0.12 |

Experiment 2

Seven oral care compositions (e.g., toothpastes) were created and measured using cell hemolysis via the assay method above. Each of the seven oral care compositions included mono- and di-glycerides as the surfactant at a different percentage by weight. In Experiment 2 (as well as in Experiments 3 and 4, discussed below), a more irritating base composition was used than the base composition used in Experiment 1. This is because the use of mono- and di-glycerides with the base composition of Experiment 1 resulted in a value that was over the detection limit of the spectrophotometer. Therefore, the differences between solutions with mono- and di-glycerides at different percentages by weight were not observable. The use of the more irritating base composition of Experiments 2-4 allowed the differences between the different oral care compositions to be observable.

Toothpaste composition 100 did not include any mono- and di-glycerides (i.e., the percentage by weight of mono- and di-glycerides was 0.0%). Toothpaste composition 102 included mono- and di-glycerides as the surfactant at about 0.5% by weight. Toothpaste composition 104 included mono- and di-glycerides as the surfactant at about 1.0% by weight. Toothpaste composition 106 included mono- and di-glycerides as the surfactant at about 2.0% by weight. Toothpaste composition 108 included mono- and di-glycerides as the surfactant at about 4.0% by weight. Toothpaste composition 110 included mono- and di-glycerides as the surfactant at about 6.0% by weight. Toothpaste composition 112 included mono- and di-glycerides as the surfactant at about 8.0% by weight.

Figure 3:
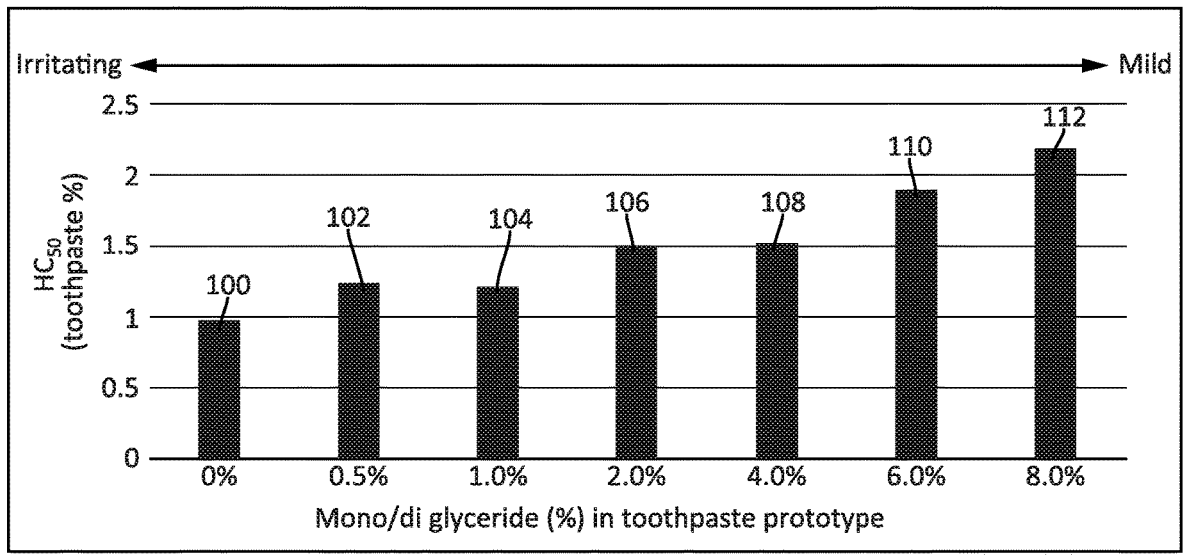
FIG. 3 shows the results of Experiment 2.

The results of Experiment 2 are shown in FIG. 3 (represented by Table 4 below), which measures the toothpaste concentration that causes 50% cell hemolysis. Toothpaste composition 112 having mono- and di-glycerides as the surfactant at a percentage by weight of 8.00% was the least irritating toothpaste as demonstrated by the about 2.19% of the toothpaste composition 112 that achieved 50% cell hemolysis. On the other hand, toothpaste composition 100 having as the surfactant at a percentage by weight of 0.00% was the most irritating toothpaste as demonstrated by the about 0.96% of the toothpaste composition 100 that achieved 50% cell hemolysis. Accordingly, Experiment 2 shows that the irritation-lowering effect of mono- and di-glycerides is dose dependent. This test also indicated that higher concentrations of mono- and di-glycerides, while effective to reduce irritation, exhibit an unpleasant taste. Experiment 2 shows a toothpaste having mono- and di-glycerides within a range of about 0.5% to about 5% reduces irritation without sacrificing taste.

TABLE 4

| Solution No. | % by Weight Mono- and Di-glycerides in Composition | $HC_{50}$(% by weight) |
| --- | --- | --- |
| 100 | 0.0 | 0.96 |
| 102 | 0.5 | 1.24 |
| 104 | 1.0 | 1.20 |
| 106 | 2.0 | 1.50 |
| 108 | 4.0 | 1.53 |
| 110 | 6.0 | 1.90 |
| 112 | 8.0 | 2.19 |

Experiment 3

Three oral care compositions (e.g., toothpastes) were created and subjected to the cell hemolysis method. Each of the three oral care compositions included a monoglyceride and diglyceride mixture at a percentage by weight of 4.00%, but each of the three toothpastes had a different monoglyceride to digylceride ratio. Toothpaste composition 200 included mono- and di-glycerides having 42% monogylceride. Toothpaste composition 202 included mono- and di-glycerides having 52% monogylceride. Toothpaste composition 204 included a pure monoglyceride (i.e., 100% monogylceride).

Figure 4:
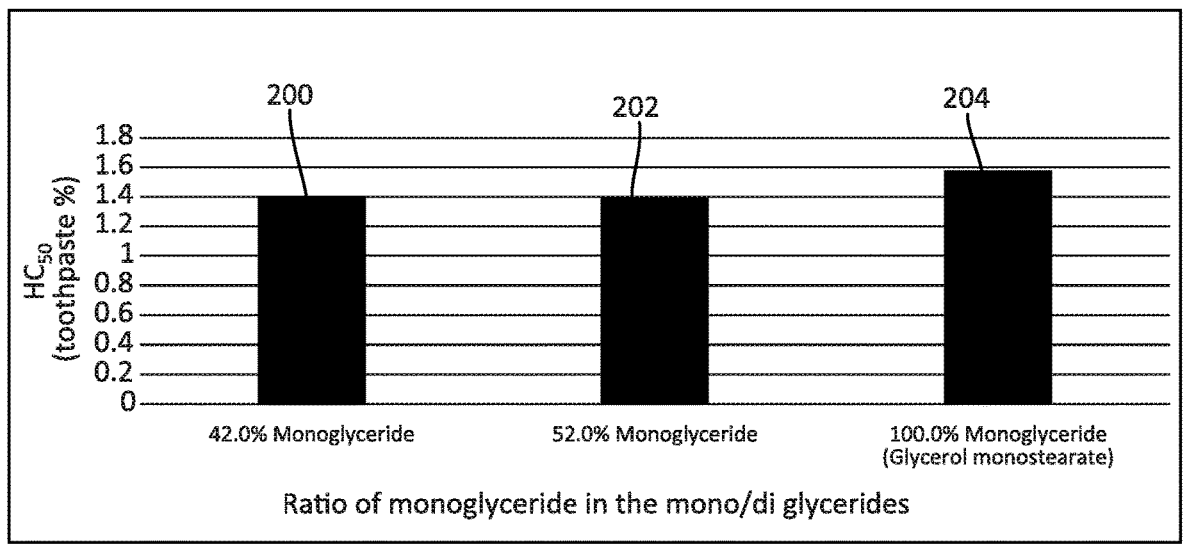
FIG. 4 shows the results of Experiment 3.

The results of Experiment 3 are shown in FIG. 4 (represented by Table 5 below), which measures the toothpaste concentration that causes 50% cell hemolysis. Toothpaste composition 204 having the pure monoglyceride was the least irritating toothpaste as demonstrated by the about 1.58% of the toothpaste composition 206 that achieved 50% cell hemolysis. On the other hand, toothpaste composition 202 having mono- and di-glycerides with 52% monoglyceride was the most irritating toothpaste as demonstrated by the about 1.39% of the toothpaste 202 that achieved 50% cell hemolysis. Toothpaste composition 200 having mono- and di-glycerides with 42% monoglyceride was slightly less irritating than toothpaste composition 202 toothpaste as demonstrated by the about 1.41% of the toothpaste composition 200 that achieved 50% cell hemolysis. In total, however, the difference between the toothpaste compositions having different percentages of monogylcerides is small (about than 0.2%) and therefore, the ratio of monoglycerides to diglycerides does not have a substantial effect on the irritation reducing properties of toothpaste.

TABLE 5

| Solution No. | % Monogylceride in Mono- and Di-glycerides | $HC_{50}$(% by weight) |
|---|---|---|
| 200 | 42% Monogylceride | 1.41 |
| 202 | 52% Monoglyceride | 1.39 |
| 204 | 100% Monoglyceride (Glycerol Monostearate) | 1.58 |

Experiment 4

Four oral care compositions (e.g., toothpastes) were created and subjected to the cell hemolysis method. Each of the three oral care compositions included glyceryl monostearate, which is a monoglyceride surfactant that is a pure monoglyceride. Each of the toothpaste compositions included different percentages by weight of glyceryl monostearate. Toothpaste composition 300 included no (i.e., 0.0%) glyceryl monostearate. Toothpaste composition 302 included 0.50% by weight of glyceryl monostearate. Toothpaste composition 304 included 4.0% by weight of glyceryl monostearate. Toothpaste composition 306 included 8.0% by weight of glyceryl monostearate.

Figure 5:
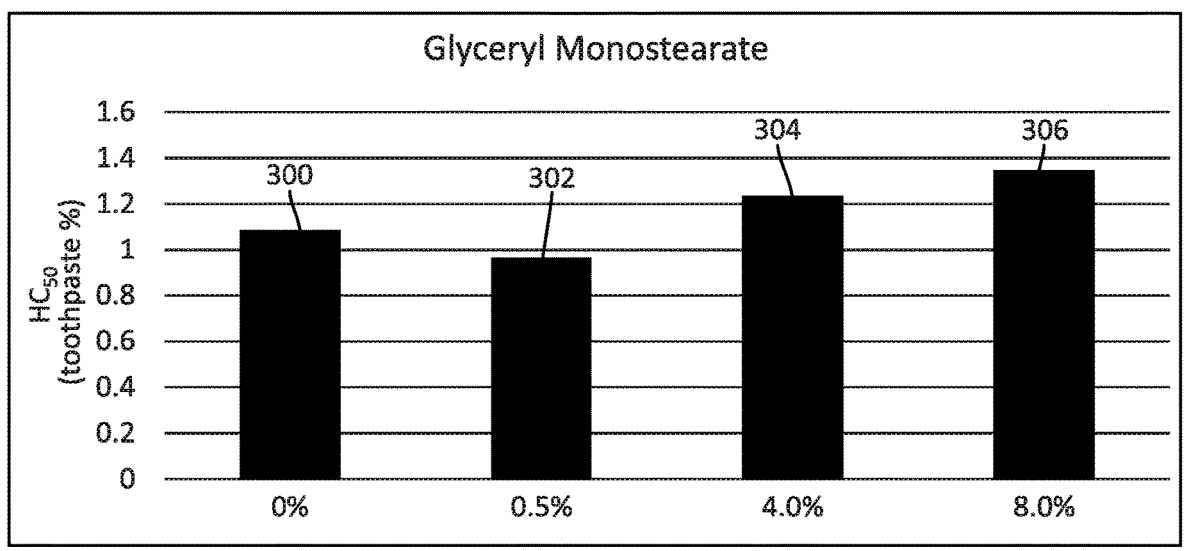
FIG. 5 shows the results of Experiment 4.

The results of Experiment 4 are shown in FIG. 5 (represented by Table 6 below), which measures the toothpaste concentration that causes 50% cell hemolysis. Toothpaste 306 having 8.0% by weight glyceryl monostearate was the mildest toothpaste as demonstrated by the about 1.35% of the toothpaste 306 that achieved 50% cell hemolysis. Glyceryl monostearate is generally less irritating than other non-mono/diglyceride surfactants, but slightly more irritating and less soluble than a monoglyceride and diglyceride mixture. Glyceryl monostearate is harder to dissolve in an oral care composition than monoglyceride and digylceride mixtures. Accordingly, Experiment 4 shows that the solubility of the surfactant may affect the mildness of the toothpaste.

TABLE 6

| Solution No. | % Glyceryl Monostearate | $HC_{50}$(% by weight) |
|---|---|---|
| 300 | 0.0 | 1.09 |
| 302 | 0.5 | 0.96 |
| 304 | 4.0 | 1.23 |
| 306 | 8.0 | 1.35 |

Although the invention has been described in detail with reference to certain preferred embodiments, variations and modifications exist within the scope and spirit of the invention as described.

What is claimed is:

1. A toothpaste or gel solution comprising:
a base composition comprising humectant in an amount of 35% to 85% by weight of the toothpaste or gel solution, the humectant comprising glycerin, and an abrasive material in an amount of about 0.1% to about 35% by weight of the toothpaste or gel solution, the base composition being essentially free of anionic surfactants; and
a nonionic surfactant in an amount of about 2.0% to about 4.0% by weight of the toothpaste or gel solution,
wherein the nonionic surfactant is C14-C18 mono- and di-glycerides;
wherein the C14-C18 mono- and di-glycerides comprise 30% monoglycerides, 42% monoglycerides, 46% monoglycerides, or 52% monoglycerides; and
wherein an $HC_{50}$ concentration of the toothpaste or gel solution is greater than an $HC_{50}$ concentration of a toothpaste or gel solution without surfactant.

2. The toothpaste or gel solution of claim 1, wherein the base composition includes one or more additional surfactants, soothing agents, desensitizing agents, flavoring agents, sweetening agents, humectant agents, coloring agents, polishing materials, abrasive materials, antimicrobial agents, binders, thickening agents, fluoride, preservatives, and water.

3. The toothpaste or gel solution of claim 1, the humectant further comprising propanediol.

4. The toothpaste or gel solution of claim 1, wherein the abrasive material comprises silica or hydrated silica.

5. A method of reducing irritation of an oral care composition, the method comprising:
mixing a base composition and a nonionic surfactant,
the base composition comprising humectant in an amount of 35% to 85% by weight of the oral care composition, the humectant comprising glycerin, and an abrasive material in an amount of about 0.1% to about 35% by weight of the oral care composition, the base composition being essentially free of anionic surfactants; and
the nonionic surfactant comprising C14-C18 mono- and di-glycerides, the C14-C18 mono- and di-glycerides comprising 30% monoglycerides, 42% monoglycerides, 46% monoglycerides, or 52% monoglycerides;
wherein the nonionic surfactant measures about 2.0% to about 4.0% by weight of the oral care composition; and
wherein an $HC_{50}$ concentration of the oral care composition is greater than an $HC_{50}$ concentration of an oral care composition without surfactant.

6. The method of claim 5, wherein the base composition includes one or more additional surfactants, soothing agents, desensitizing agents, flavoring agents, sweetening agents, humectant agents, coloring agents, polishing materials, abrasive materials, antimicrobial agents, binders, thickening agents, fluoride, preservatives, and water.

* * * * *